US00RE36937E

United States Patent [19]

Mackley

[11] E Patent Number: Re. 36,937

[45] Reissued Date of Patent: Oct. 31, 2000

[54] ISOTHERMAL PREPARATION OF CHOCOLATE PRODUCTS

[75] Inventor: Malcolm R. Mackley, Cambridge, United Kingdom

[73] Assignee: Nestec S.A., Vevey, Switzerland

[21] Appl. No.: 08/906,479

[22] Filed: Aug. 5, 1997

Related U.S. Patent Documents

Reissue of:

[64] Patent No.: 5,439,695
Issued: Aug. 8, 1995
Appl. No.: 08/281,866
Filed: Jul. 28, 1994

U.S. Applications:

[63] Continuation of application No. 08/096,703, Jul. 22, 1993, abandoned, which is a continuation-in-part of application No. 08/084,559, Jun. 29, 1993, abandoned.

[30] Foreign Application Priority Data

Sep. 29, 1992 [GB] United Kingdom ..... 9220477

[51] Int. Cl.[7] ..... A23G 7/00

[52] U.S. Cl. ..... 426/516; 426/660

[58] Field of Search ..... 426/512, 516, 426/660; 425/205, 308, 382.4

[56] References Cited

U.S. PATENT DOCUMENTS

| | | | |
|---|---|---|---|
| 1,628,251 | 5/1927 | Laskey | 426/516 |
| 1,649,307 | 11/1927 | Hunter | 426/516 |
| 2,332,211 | 10/1943 | Field | 425/308 |
| 3,098,746 | 7/1963 | Noznick et al. | 426/660 |
| 3,307,503 | 3/1967 | Elmer et al. | 426/516 |
| 4,426,402 | 1/1984 | Kaupert | 426/515 |
| 4,713,256 | 12/1987 | Chaveron et al. | 426/660 |

FOREIGN PATENT DOCUMENTS

| | | |
|---|---|---|
| 60-116433 | 6/1985 | Japan . |
| 63-68043 | 3/1988 | Japan . |
| 223362 | 10/1924 | United Kingdom . |
| 221502 | 12/1927 | United Kingdom . |
| 385571 | 3/1931 | United Kingdom . |
| 1527240 | 10/1978 | United Kingdom . |
| 1604585 | 12/1981 | United Kingdom . |

*Primary Examiner*—George C. Yeung
*Attorney, Agent, or Firm*—Pennie & Edmonds LLP

[57] ABSTRACT

Chocolate products are formed by feeding solid set chocolate to an extruder and passing the chocolate through the extruder at a temperature below the pour point of the chocolate to deform and extrude the chocolate.

44 Claims, 6 Drawing Sheets

ISOTHERMAL PREPARATION OF CHOCOLATE PRODUCTS

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation application of application Ser. No. 08/096,703, filed Jul. 22, 1993, and now abandoned, and which, in turn, is a continuation-in-part application of application Ser. No. 08/084,559, filed Jun. 29, 1993, now abandoned.

BACKGROUND OF THE INVENTION

The present invention relates to extrusion of fat-containing confectionery products and particularly to extrusion of chocolate.

Fat-containing confectionery products, generally, are prepared from fats, including fat fractions and fat-substitutes, and may include sugar, milk-derived components, and solids from vegetable or cocoa sources in various proportions.

In general, chocolate products, which may be divided into groups of plain, or dark, chocolate and milk chocolates, including white chocolate, have a moisture content less than about 5% by weight. Plain chocolate typically is obtained by mixing sugar, cocoa butter (and optionally other fats and/or fat fractions and/or fat substitutes) and cocoa mass. Milk chocolate contains milk fat and non-fat milk solids (and optionally vegetable fat and/or fat fractions and/or fat substitutes) as additional ingredients. White chocolate contains milk fat and non-fat milk solids, sugar and cocoa butter (and optionally other fats and/or fat fractions and/or fat substitutes) without with addition of cocoa mass.

Although extrusion of various confectionery products is known, processes to effect such generally require employment of cooling and heating devices auxiliary and/or integral with the extrusion apparati, and although extrusion and pressing of chocolate have been mentioned in the art, such as British Complete Specifications Nos. 223,362, 385,571 and 1 604 585, it is not believed that such has found application, particularly in a commercial mass production setting, without the aid of heating and cooling devices.

In the British '362 Specification, a process is disclosed for forming chocolate coverings or containers suitable for being filled, wherein solid bulk chocolate is forced under "high pressure" through an extrusion tube-forming die. It is taught that the temperature of the chocolate being processed which is generated by friction during compression in the die, is to be reduced by circulation of a cooling fluid in the die to maintain a "suitable" degree of plasticity within the die so that the chocolate is extruded in a hard, dense, non-porous condition.

In the British '571 Specification, a process is disclosed for manufacturing a tubular strip of chocolate, wherein a chocolate mass is introduced into a tube press similar to that which had been used for pressing cold macaroni and biscuit doughs, but provided with a heating jacket to heat the chocolate mass to a temperature of from 28° C. to 32° C., and the heated mass is pressed is disclosed for forming net-like products, wherein chocolate is tempered to a temperature of from 28° C. to 31° C. to provide viscosity properties which enable it to be extruded. The product extruded is cooled immediately to 15° C. to 20° C. after emerging from the die.

Typically, however, in a commercial production setting, chocolate products are prepared by mixing the chocolate ingredients and then grinding the mixture to a paste before conching at temperatures from 50° to 85° C. for periods of time of from a few hours to a few days, depending on the type of product and the equipment used. The conched chocolate then is cooled for tempering it, whereby glycerides are crystallized so the chocolate may acquire a stable condition when subsequently set. Cooling is carried out to achieve a tempering temperature on the order of from about 27° C. to about 33° C., depending upon the chocolate composition and character, particularly with a view to fat content. The tempering provides a flowable and pourable pasty mass, and in the usual production setting, because of viscosity considerations, the tempered chocolate is immediately directed to a molding or enrobing operation to prepare final products, after which, the products set.

As is known in the art, because of tempering, when the temperature of a set chocolate is increased above the final tempering temperature, the chocolate will remain solid up to a certain temperature above that final tempering temperature, and will not assume a pourable characteristic until it reaches a certain temperature in excess of the final tempered temperature. That is, the pour point of the chocolate has been altered by setting after tempering, and as the temperature of such chocolate is progressively increased above a temperature at which it was tempered, it softens due to partial melting of the fats until, again depending on the composition of the chocolate, it reaches its new pour point, whereat the chocolate has a viscosity that is sufficiently low for it to be flowable and to be poured.

Thus, in the context of a commercial production setting, generally, since tempered chocolate should be used within a short time for final product preparation, various production problems, including production equipment coordination, and product losses may result. To enhance commercial production efficiency, seeding of tempered chocolate and holding it at elevated temperatures has been suggested. Still, however, final production formation requires cooling means, such as cooling tunnels. On the other hand, if the tempered chocolate is not formed into a final product prior to being set, auxiliary equipment must be employed to heat the set chocolate, if it is to be reformed into a different final product, and that product, too, then is best cooled for setting. Still, therefore, means for solving such problems still are sought, as are means to avoid the need to cool the final product, with such as a cooling tunnel, and its attendant expense in terms of equipment and energy requirements.

SUMMARY OF THE INVENTION

It has been discovered that a non-pourable fat-containing confectionery material, and in particular, a set chocolate, can be plasticized and extruded to produce a non-pourable product which is characterized by having an advantageous temporary flexibility which may persist for up to several hours.

According to the present invention, there is provided a process for plasticizing and extruding a fat-containing confectionery material which comprises applying pressure to a fat-containing confectionery material, which is in a substantially non-pourable state, to pass it through a zone of convergence to plasticize it and extruding the material to obtain the material in a substantially non-pourable state. By proceeding in accordance with the process of the present invention, an axially homogeneous extruded product having a cross-section that is of substantially the same profile as a die orifice of the extruder from which it is extruded is obtained.

The present invention is more particularly characterized in that a fat-containing confectionery material is plastically extruded by passing a fat-containing confectionery material under a pressure at a temperature below its pour point to and through a zone of convergence and extruding the converged material through an extrusion outlet so that the extruded material remains at a temperature below its pour point.

In the case of chocolate, the chocolate employed must be set and may have been previously processed by means known to those skilled in the art, including super-cooling tempering.

The fat-containing confectionery material is most advantageously a chocolate, be it plain, milk or white chocolate, although caramel, toffee and butterscotch, for example, may be employed. Advantageously the material is in a granulated form, and chocolate buttons are especially preferred.

Surprisingly, it has been discovered that, particularly in the case of a set chocolate, the process of the present invention is substantially isothermal. It has been found that the temperature of the set non-pourable chocolate does not increase materially to effect a change in character from the non-pourable state, and in practice, the temperature may be found to remain substantially constant. Although not seeking to be bound by theory, it is believed that heat generated by the process interacts with the set chocolate fat crystallinity to effect the substantially isothermal characteristic of the process. Thus, the physical state of the chocolate is such that its general deformation behavior during extrusion alters only to that of a plastic nature rather than that of a viscous fluid, and since the product is "cold" extruded, cooling means typically employed for chocolate product preparation, such as cooling tunnels, are not necessary.

DETAILED DESCRIPTION OF THE INVENTION

Although a broad range of temperatures, including temperatures of from about 0° C. to about 35° C., may be employed to effect the process, particularly in the case of chocolate, as long as such are below the pour point of the chocolate, it has been discovered that the process may be carried out at ambient, i.e., normal room temperature, and at temperatures below tempering temperatures. Hence, the process may be carried out wherein the material has a temperature on the order of from about 27° C. down to about 20° C.

In such preferred embodiments of the process of the present invention, therefore, external means for heating and/or cooling the chocolate during the process are avoided, the process being carried out without additional heating and/or cooling of the material to be processed. However, for precise temperature control, the use of external heating or cooling means is not excluded, as long as the material being extruded is in a substantially non-pourable state.

Thus, all temperature of the material during extrusion may be a temperature up to the pour point of the material, which may be up to about 35° C. depending on the composition of the material, particularly the amount and type of fat, or fat and fat fraction and/or fat-substitute present, higher temperatures being enabled to be employed when the confectionery material contains higher proportions of high melting fat, or fat fraction and/or fat-substitute components. Should it be desired to carry out the process at temperatures lower or higher than ambient temperature, cooling means, provided such as by jacketing an extruder means, may be employed, as may heating means, when higher temperatures are desired.

Also, as indicated above, extruding the material at temperatures of from about 20° C. to about 27° C. provides substantial advantage, but plain chocolate may also be processed, for example, within temperature ranges of from about 10° C. to 34° C., or from about 15° C. to about 32° C., but more preferably from about 18° C. to 30° C., and most preferably from about 20° C. to about 27° C. Milk chocolates, including white chocolate, also may be processed at temperatures of from about 10° C. to about 30° C., or from about 15° C. to about 28° C., more preferably from about 18° C. to about 27° C. and most preferably from about 20° C. to about 26° C.

Although the fat-containing confectionery material may be fed into the barrel of an extruder in a liquid or pourable paste for, which would thereby require subsequent cooling to effect a non-pourable form for flow constriction, plasticizing and non-pourable extrusion, preferably, the material is fed into the extruder in a non-pourable solid or semi-solid form. Most advantageously, the present invention enables the material to be processed to be previously maintained in a granular form, particularly buttons, and it has been discovered that when in granular form, the granular nature of the material has been found to be at least substantially, if not entirely, lost during extrusion to give an essentially uniform material.

In practice of the present invention, plasticization is generated by a differential pressure across the zone of convergence which is provided by a flow constriction. The zone of convergence may be formed by a flow constriction which may be a narrowing of the cross-sectional area of an extrusion conduit, and most conveniently, such may be provided in association with the configuration an extrusion die integral with the output end of an extruder.

The zone of convergence may be effected with any of a variety of extrusion means including but not limited to, for example, ram extruders, constant pressure extruders, single and twin screw extruders, or extrusion means such as a DAVENPORT extrusion rheometer or a CONFIRM machine, operating under controlled pressures and rates. As will be appreciated, such apparati may provide for continuous or batch operation.

As indicated above, the extrusion process requires a construction of the flow of processed material in a zone of convergence. Hence, the material deforms before the outlet of the extruder device. The convergence ratio should be greater than 1.5, the convergence ratio being defined as the ratio of the cross-sectional area prior to flow constriction of the area of minimum flow constriction, which, in the case of a die providing such, is the inlet cross-sectional area to the minimum cross-sectional area of the extrusion outlet die for a simple cylindrical extrusion geometry.

A wide range of extrusion pressures may be employed, with the caveat that the pressure employed, in combination with the material temperature, does not cause the material to become pourable. Pressures employed may range from about 1 bar to about 1000 bars, preferably from about 5 bars to about 500 bars and most preferably from about 5 bars to about 250 bars. As will be appreciated, the extrusion pressure applied and generated is partially dependent on the convergence ratio, the extrusion temperature and the confectionery composition, and it has been found that for a given die configuration and material composition, the extrusion rate is weakly dependent upon the extrusion pressure.

In practice of the present invention, it will be found that the flow rate of the chocolate extruded through the extruder die will depend, primarily on extrusion pressure, temperature, die configuration and material formulation. Extrusion rates may vary from 0.1 cm/sec to in excess of 1 m/sec, for instance.

The sectional geometry of the die may be of a square or profiled form, the configuration employed also being affected if such is to be employed as the flow constriction device to provide the zone of convergence. Advantageously, the die has a flared or conically shaped entry portion fitted in the extrusion barrel, with a product inlet portion to outlet portion angle, with respect to a longitudinal axis of the extruder, of from about 10° to about 90°, preferably from 30° to about 60°, and most preferably from about 40° to 50°.

The extrusion die shapes provide for preparing solid or hollowed profiled products, e.g., bars, rods, spirals, twists, springs, hollow sections such as tubes and more complex shapes such as the letters of the alphabet, as well as thin films having a thickness which may be as little as 100 microns. The dimensions of the die depend on a desired size of the extruded product, and extruded products may be cut at the die with such as a flying cutter or rotary knife.

Two or more fat-based materials may be co-extruded in accordance with the process of the present invention, and the fat-containing confectionery material may be co-extruded with other food materials, such as ice creams, fondants, etc., such being advantageous when the fat-containing confectionery material is extruded in a hollow or tubular form. Hence, in such embodiments, a multi-orifice die and/or associated equipment, as are known to those skilled in the art, may be employed.

Advantageously, the flow constriction plasticizing zone of convergence aspect of the present invention also may be integrated with a mold to provide an integral injection molding process, in which case, the final shape of the product conforms to that of the mold, e.g., hollow shells, such as "Easter eggs", and other solid shapes. In contrast to other injection molding processes, cooling means and equipment are not essential, and the molded product can be packaged directly. The injection molding therefore is easy to control, and significantly less losses of material, as compared with conventional injection molding using a molten material, advantageously are realized.

Injection molding thus is effected at the processing temperatures described above, and the material, e.g., chocolate, is extruded through a flow constriction which forms the injection nozzle of the molding machine. Although the temperature of the mold may differ from that of the temperature of the extruded material, it is conveniently approximately the same as the extrusion temperature within the ranges hereinabove described for the extrusion process.

In one injection-molding embodiment, the chocolate may flow within channels of the mold and subsequently flow through a narrow gate, e.g., from 100 and 500 microns, into a mold. The chocolate extrudes into the mold as a flexible filament of semi-solid chocolate. As the extrusion continues, the mold progressively fills with chocolate until all of the mold is filled. At this point, the pressure within the mold is sufficient to allow the full consolidation of the chocolate to occur. When this point has been reached, no further flow occurs and the extrusion pressure can be released. At this point, the mold can be opened and the injection-molded entities removed from the mold either mechanically or, for example, with the air of vacuum means known to those skilled in the art.

The injection molding process may also include multi-feed injection into molds using different components in each feed. In addition, the process may be used for coating centers which are positioned in the empty mold before injection molding. The injection molding process may, if desired, be fully automated.

The products of the present invention maintain good organoleptic properties and, significantly, they retain their shape and advantageously have an initial flexibility or plasticity after extrusion which may persist for up to several hours before being lost, particularly when the temperature of the extruded products are maintained at a temperature which approximates its extrusion temperature. The flexibility may last or be maintained, for example, for up to 4 hours although such lasts or is maintained for up to 2 hours and more often for from 5 minutes to 1 hour.

Owing to the flexibility or plasticity of the extrudate, physical manipulation or plastic deformation of the extrudate is possible before the flexibility or plasticity is lost, e.g., bending, tying into knots, downstream of the die enabling more complex forms of finished products to be achieved.

The following Examples and description of the accompanying drawing Figures are presented to illustrate the present invention further and are meant to be non-limiting.

EXAMPLES AND DETAILED DESCRIPTION OF THE DRAWINGS

Example 1

Figure 7:
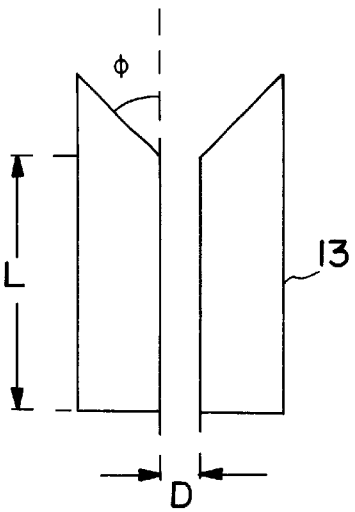
FIGS. 6 and 7 illustrate an extruder embodiment for carrying out the process of Examples 1–4 below.
Figure 6:
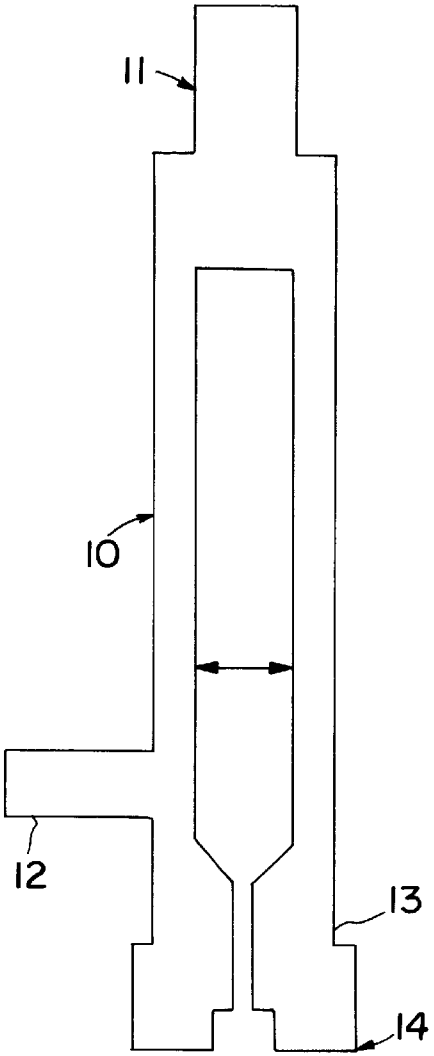

Set milk chocolate buttons are fed into the barrel of a DAVENPORT extrusion rheometer, the barrel having been modified in order to provide a side-mounted pressure transducer immediately above the extrusion die as shown in FIGS. 6 and 7, which illustrate a barrel 10, piston 11, pressure transducer 12, extrusion die 13 of length L, cross-section D and entry angle $\phi$, and a retaining nut 14.

The barrel of the extruder for carrying out the Example has a diameter of 19.5 mm. Two batches of buttons are processed. The chocolate buttons of each batch are equilibrated at a temperature of about 24° C., and are forced at a pressure of about 50 bars through the die, which has a circular cross-section of 4 mm diameter and 8 mm length and a 45° entry angle.

Figure 1:
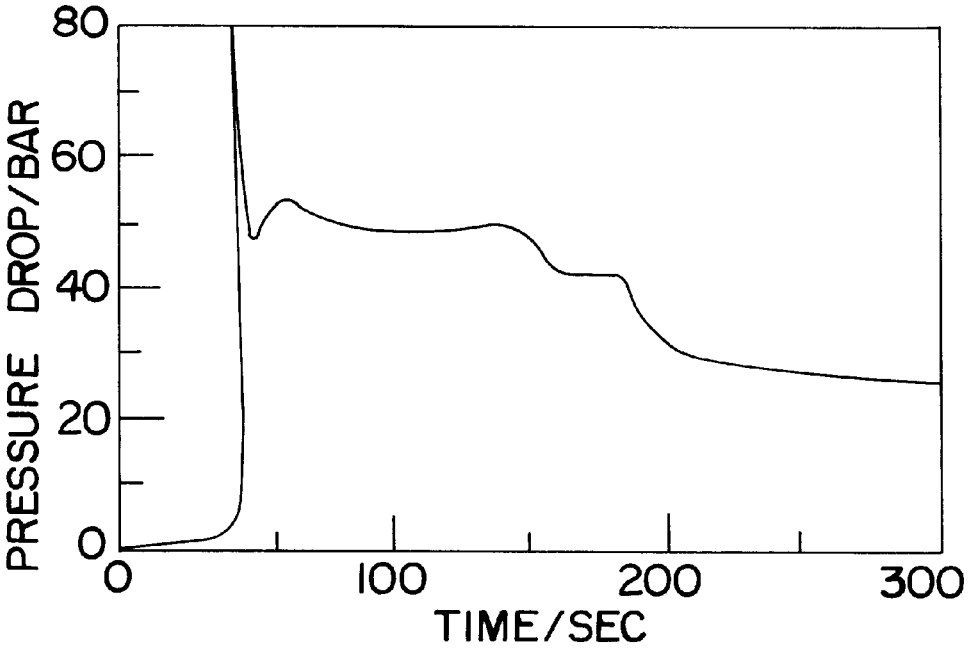
FIGS. 1–5 illustrate extruded product pressure profiles and flow rates of the process of the present inventions carried out in accordance with Examples set forth below.
Figure 2:
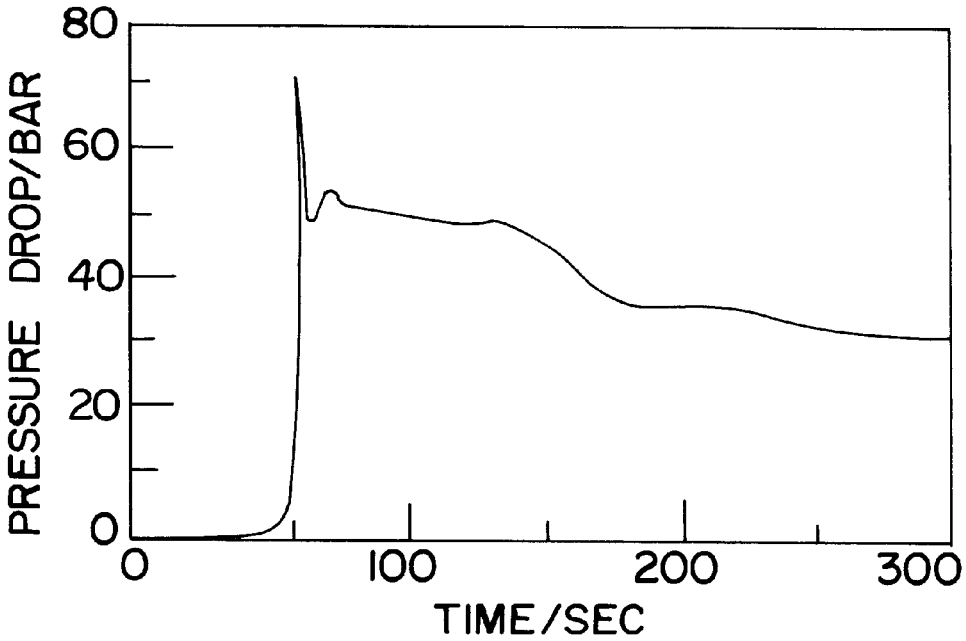

Smooth continuous extrusions, which have flow rates of about 16 mm/sec are obtained, the time evolution of the pressure profile during extrusion being illustrated in FIGS. 1 and 2. As will be seen, after an initial yield pressure is reached, the extrusion pressure drops to an essentially constant value. On the cessation of flow (after 180 seconds in FIG. 1), there is a relaxation of the extrusion pressure.

A solid non-pourable, rod-shaped product is obtained which retains its shape, but which is flexible for 30 minutes, during which period it can be bent or even twisted into knots before hardening, if desired.

Example 2

Figure 3:
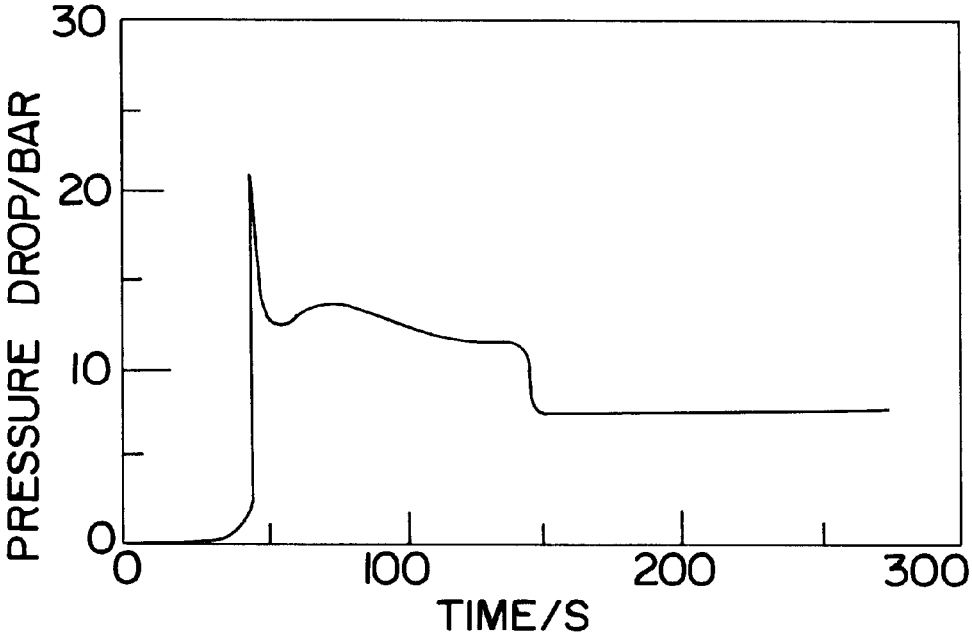
Figure 4:
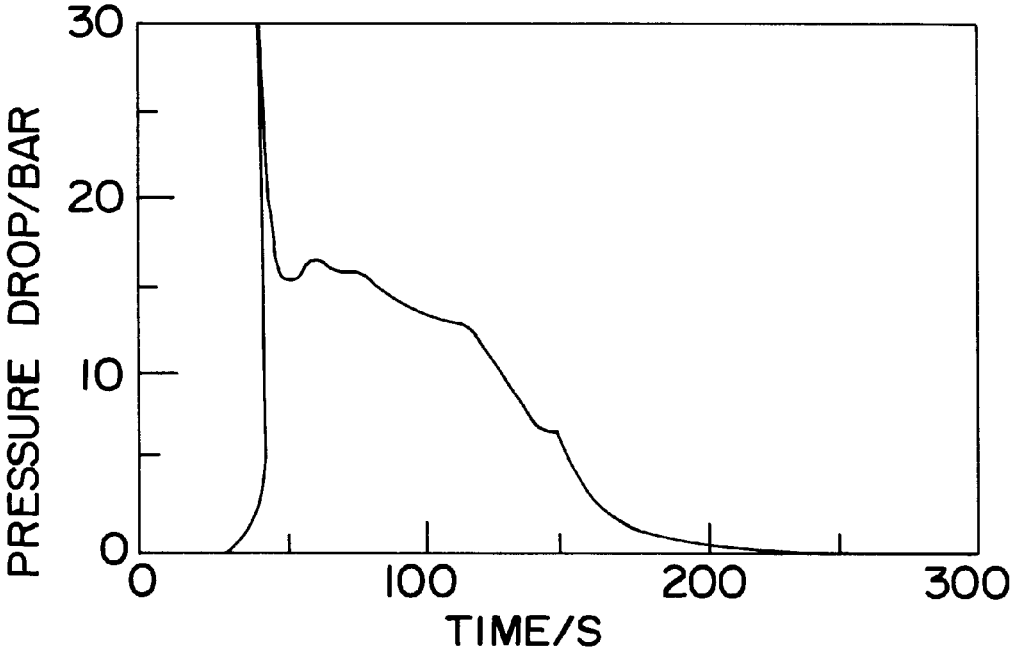

A procedure similar to that described in Example 1 is followed, except that the button material extrusion temperature is about 28° C. The profile and rate results for two samples are shown in the accompanying FIGS. 3 and 4.

Example 3

Figure 5:
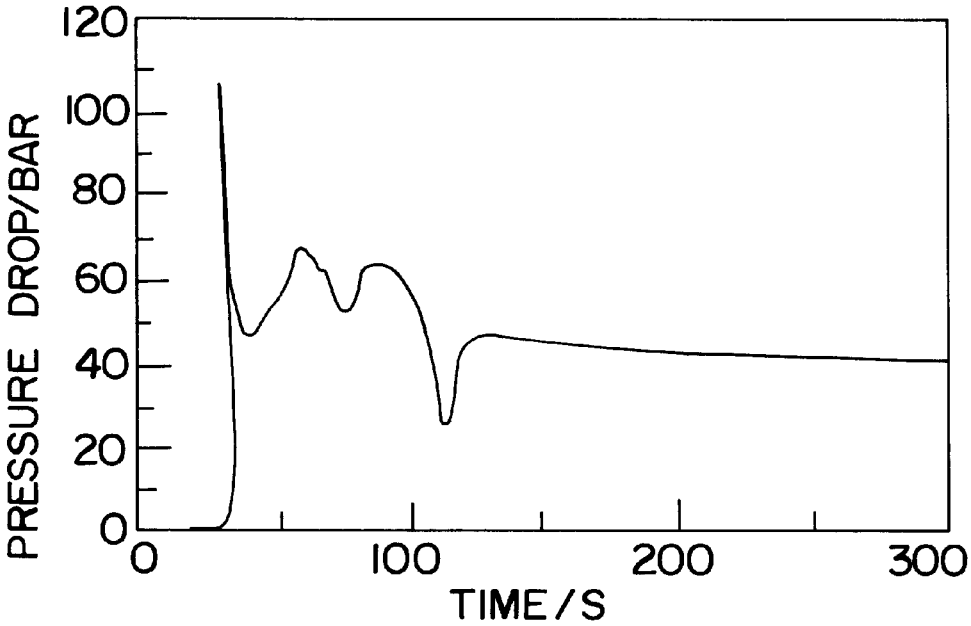

A procedure similar to that described in Example 1 is followed, except that the button material extrusion temperature is about 18° C. The profile and rate results are shown in FIG. 5.

Example 4

Using a hydraulically-driven piston at an essentially constant pressure, it is found that a mass of chocolate extruded through a 4 mm diameter circular orifice with output flow rates of between 1 cm/sec and 100 cm/sec exhibits weak dependence on the differential pressure across the die characterized by a logarithmic-linear relationship when extruding.

Example 5

Using the procedure described in Example 4, a chocolate is extruded through a 4 mm die at various temperatures. The following pressures produce similar rates of output:

| Temperature ° C. | Start-up pressure bar | Flow pressure bar |
|---|---|---|
| 20 | 500 | 470 |
| 24 | 200 | 180 |
| 27 | 50 | 40 |

Example 6

A procedure similar to that described in Example 4 is followed except that the orifice is replaced by a slit with dimensions of 1 mm×20 mm. A solid, non-pourable flexible thin ribbon of chocolate is produced at flow rates of from 1 cm/sec to 100 cm/sec.

Example 7

Figure 8:
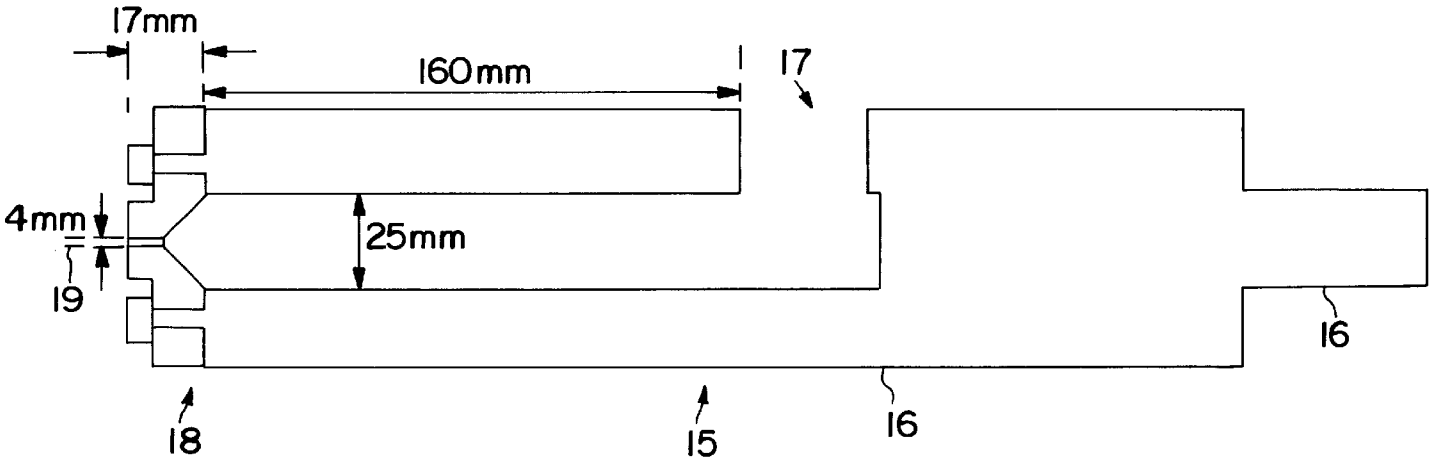
FIGS. 8–10 illustrate further embodiments of an extruder embodiment which may be employed in carrying out the present invention.

A FLORIN hydraulically driven ram extruder, such as illustrated in FIG. 8, comprises a barrel 15, a hydraulically driven ram 16, feed opening 17, extrusion die 18 having a cross-section of 4 mm diameter and an internal barrel diameter of 25 mm. Chocolate buttons having a temperature of about 23° C. are dropped in the feed opening 17 followed by hydraulically advancing the ram at a pressure of about 80 bars, and semi-continuous solid non-pourable rods 19 of about 4 mm diameter are produced which retain their shape and have an initial flexibility which lasted for about 40 minutes.

Example 8

Figure 9:
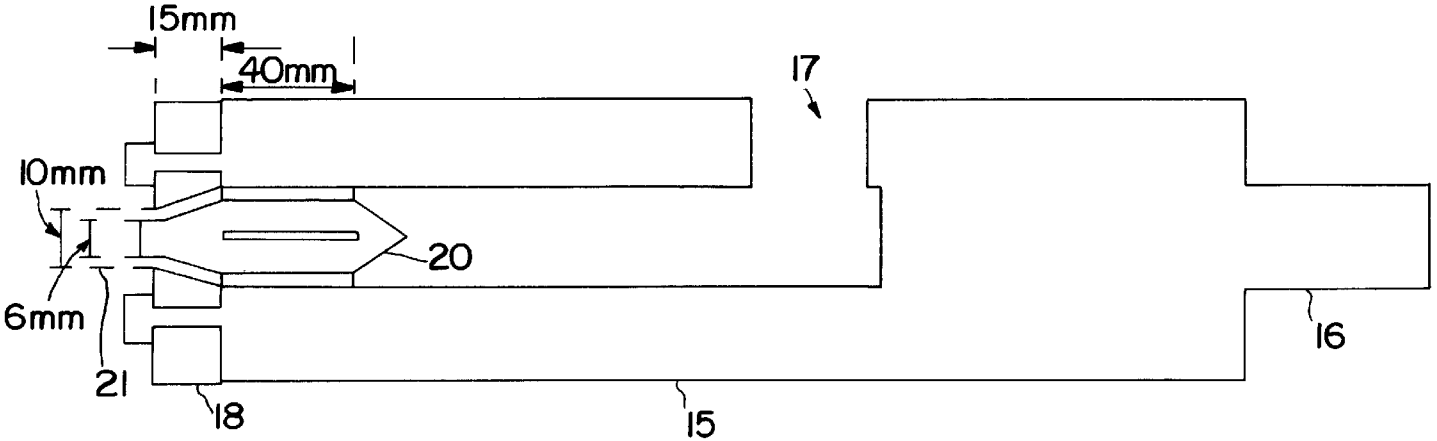

A FLORIN extruder, such as that illustrated in FIG. 8, but having a centered "torpedo" 20 positioned in the barrel, is illustrated in FIG. 9. The same procedure is followed as in Example 7, but instead of producing rods, solid non-pourable hollow tubular sections 21 are produced having an outer diameter of about 10 mm and an internal diameter of about 6 mm.

Co-extrusion with fondant may be carried out by using a "torpedo" provided with a longitudinal channel through which the fondant flows to give a chocolate coated fondant.

Example 9

Figure 10:
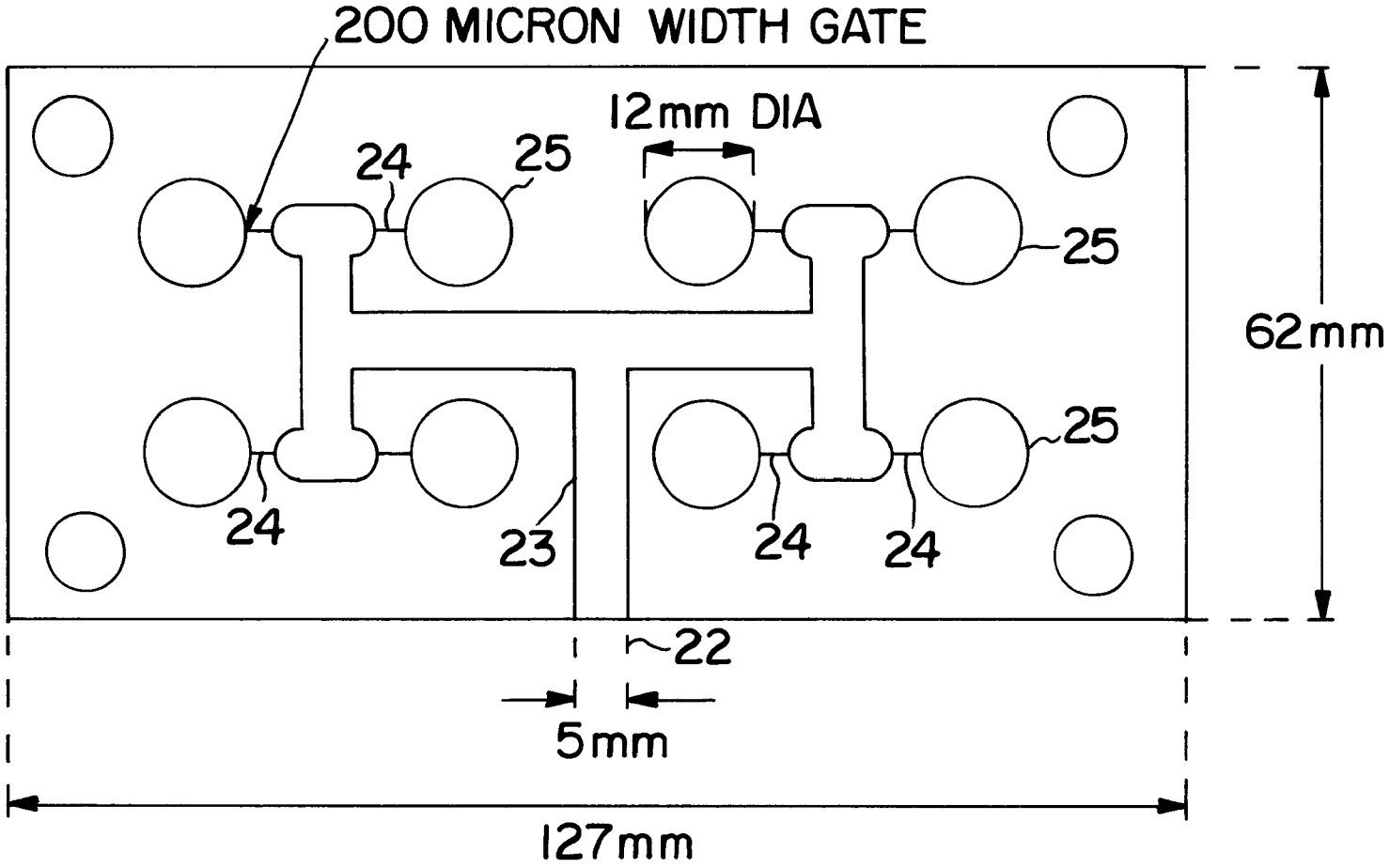

A FLORIN ram extruder, such as that illustrated in FIG. 8, but whose die has a cross-section of 5 mm diameter, is adapted to form the injection nozzle of a molding machine, such as illustrated in FIG. 10. The injection molding of the chocolate is carried out in a manner so that the temperature of both the extruder and the mold is about 25° C., and a pressure of about 80 bars is applied by the ran, and the split mold is clamped using hydraulic pressure. Semi-continuous rods 22 flow within the channels 23 and then through the gates 24, each having a width of about 200 microns, into the hollow spherical molds 25, each having a diameter of about 12 mm. The chocolate extrudes into each mold as a flexible filament of semi-solid chocolate. As the extrusion continues, the mold progressively fills with chocolate until all of the mold is filled. At this stage, the pressure within the mold is sufficient to allow full consolidation of the chocolate to occur. When this point has been reached, no further flow occurs, and the extrusion pressure is released. The mold then is opened, and the injection molded chocolate entities are removed from the mold. Unlike most other injection molding processes, it is not necessary to cool the product immediately after the injection molding, and the product is enabled to be packaged directly.

As is clear from the foregoing, various modifications of the present invention may be made without departure from the spirit and scope of the disclosure, and the invention may be practiced suitably in the absence of elements and/or process steps not specifically disclosed herein.

I claim:

1. A process for forming chocolate products comprising feeding solid set chocolate into an extruder having a zone of convergence and an extrusion die outlet and passing the chocolate under pressure and at a temperature below its pour point temperature through the extruder *and* to and through the zone of convergence and the outlet to *thereby* deform, plasticize and extrude a *non-pourable, flexible,* plasticized chocolate extrudate from the outlet [so that the chocolate deformed, plasticized and extruded] *and controlling the temperature, extrusion pressure and extrusion rate to form a plasticized extrudate that* has a temperature below the pour point temperature of the set chocolate [and] so that, at a temperature which approximates the temperature of the extrudate upon issuance from the outlet, the extrudate maintains plasticity for from 5 minutes up to 4 hours prior to hardening.

2. A process according to claim 1 wherein the chocolate is plain chocolate.

3. A process according to claim 2 wherein the plain chocolate is passed through the extruder and extruded at a temperature of from about 20° C. to about 27° C.

4. A process according to claim 1 wherein the chocolate is milk chocolate.

5. A process according to claim 4 wherein the milk chocolate is passed through the extruder and extruded at a temperature of from about 18° C. to about 26° C.

6. A process according to claim 1 wherein the chocolate is extruded under a pressure of from about 1 bar to about 1000 bar and at a rate of from about 0.1 cm/sec to about 1 m/sec.

7. A process according to claim 1 wherein the zone of convergence has a convergence ratio of at least 1.5.

8. A process according to claim 1 wherein the solid set chocolate fed to the extruder is in a granulated form.

9. A process according to claim 1 wherein the solid set chocolate fed to the extruder is in a form of buttons.

10. A process according to claim 1 wherein the chocolate is passed through the extruder without heating the extruder to heat the chocolate and without cooling the extruder to cool the chocolate.

11. A process according to claim 1 further comprising heating the solid set chocolate to a temperature below its pour point temperature and feeding the heated chocolate to the extruder and heating the extruder to a temperature below the pour point temperature of the chocolate.

12. A process according to claim 1 further comprising bending the extrudate prior to hardening of the extrudate to alter the extrudate shape.

13. A process for forming chocolate products comprising feeding solid set chocolate into an extruder having a zone of convergence and an extrusion die outlet and passing the chocolate under pressure through the extruder to and through the zone of convergence and the outlet at a temperature below its pour point temperature to deform, plasticize and extrude a flow of plasticized chocolate from the outlet so that the chocolate deformed, plasticized and extruded has a temperature below the pour point temperature of the chocolate, and at a temperature below the pour point temperature of the set chocolate, separating the chocolate flow to a plurality of separate flows, reducing a cross-section size of each separate flow to obtain flows having reduced cross-section, passing each reduced cross-section flow into a separate mold, filling each mold and then, releasing each filled mold from extrusion pressure.

14. A process according to claim 13 wherein the chocolate is plain chocolate.

15. A process according to claim 14 wherein the plain chocolate is passed through the extruder and extruded at a temperature of from about 20° C. to about 27° C.

16. A process according to claim 13 wherein the chocolate is milk chocolate.

17. A process according to claim 16 wherein the milk chocolate is passed through the extruder and extruded at a temperature of from about 18° C. to about 26° C.

18. A process according to claims 13 wherein the chocolate is extruded under a pressure of from about 1 bar to about 1000 bar and at a rate of from about 0.1 cm/sec to about 1 m/sec.

19. A process according to claim 13 wherein the zone of convergence has a convergence ratio of at least 1.5.

20. A process according to claim 13 wherein the solid set chocolate fed to the extruder is in a granulated form.

21. A process according to claim 13 wherein the solid set chocolate fed to the extruder is in a form of buttons.

22. A process according to claim 13 wherein the chocolate is passed through the extruder without heating the extruder to heat the chocolate and without cooling the extruder to cool the chocolate.

23. A process according to claim 13 further comprising heating the solid set chocolate to a temperature in a range below its pour point temperature and feeding the heated chocolate to the extruder and further comprising heating the extruder to a temperature below the pour point temperature of the chocolate.

24. A process according to claim 13 wherein the reduced cross-section flow has a cross-section size of from 100$\mu$ to 500$\mu$.

*25. A process for forming a chocolate product which comprises:*

*heating solid set chocolate to a temperature below its pour point temperature;*

*feeding the heated chocolate into an extruder having a zone of convergence and an extrusion die outlet;*

*heating the extruder to a temperature below the pour point temperature of the chocolate; and*

*passing the chocolate under pressure and at a temperature below its pour point temperature through the extruder and to and through the zone of convergence and the outlet to thereby deform, plasticize and extrude a non-pourable, flexible, plasticized chocolate extrudate from the outlet, the extrudate having a predetermined form, a temperature substantially the same as the temperature of the chocolate prior to extrusion and a plasticity at a temperature which approximates the temperature of the extrudate upon issuance from the outlet, which plasticity is maintained prior to hardening for a period of time sufficient to allow the form of the extrudate to be changed or modified to form the chocolate product.*

*26. A process for forming a chocolate product which comprises:*

*feeding solid chocolate into an extruder having a zone of convergence and an extrusion die outlet; and*

*passing the chocolate under pressure and at a temperature below its pour point temperature through the extruder and to and through the zone of convergence and the outlet to thereby deform, plasticize and extrude a non-pourable, flexible, plasticized chocolate extrudate from the outlet, the extrudate having a predetermined form, a temperature substantially the same as the temperature of the chocolate prior to extrusion and a plasticity at a temperature which approximates the temperature of the extrudate upon issuance from the outlet, which plasticity is maintained prior to hardening for a period of time sufficient to allow the form of the extrudate to be changed or modified to form the chocolate product;*

*positioning a confectionery center in a mold;*

*directing the extrudate into the mold until the mold is filled to allow full consolidation of the chocolate to occur, thus coating the center as the extrudate fills the mold; and*

*opening the mold to obtain the chocolate product.*

*27. A process for forming a chocolate product which comprises:*

*feeding solid chocolate into an extruder having a zone of convergence and an extrusion die outlet;*

*passing the chocolate under pressure and at a temperature below its pour point temperature through the extruder and to and through the zone of convergence and the outlet to thereby deform, plasticize and extrude a non-pourable, flexible, plasticized chocolate extrudate from the outlet, the extrudate having a predetermined form, a temperature substantially the same as the temperature of the chocolate prior to extrusion and a plasticity at a temperature which approximates the temperature of the extrudate upon issuance from the outlet, which plasticity is maintained prior to hardening for a period of time sufficient to allow the form of the extrudate to be changed or modified to form the chocolate product; and*

*coextruding the plasticized chocolate extrudate with another food material to form the chocolate product.*

*28. The process of claim 27, which further comprises coextruding the plasticized chocolate extrudate with a fondant to form the chocolate product.*

*29. The process of claim 27, which further comprises coextruding the plasticized chocolate extrudate with ice cream to form the chocolate product.*

*30. A process for forming a chocolate product which comprises:*

*feeding solid chocolate into an extruder having a zone of convergence and an extrusion die outlet;*

*passing the chocolate under pressure and at a temperature below its pour point temperature through the extruder and to and through the zone of convergence and the outlet to thereby deform, plasticize and extrude a non-pourable, flexible, plasticized chocolate extrudate from the outlet, and*

*controlling the temperature, extrusion pressure and extrusion rate to form a plasticized extrudate having a predetermined form, a temperature substantially the same as the temperature of the chocolate prior to extrusion and a plasticity at a temperature which approximates the temperature of the extrudate upon issuance from the outlet, which plasticity is maintained prior to hardening for a period of time sufficient to allow the form of the extrudate to be changed or modified to form the chocolate product.*

*31. The process of claim 30, which further comprises physically manipulating or deforming the form of the extrudate into a chocolate product having a form which is different from that of the extrudate prior to hardening.*

*32. The process of claim 31, wherein the plasticized extrudate is bent or tied into knots to provide a complex from for the chocolate product.*

*33. The process of claim 30, wherein the extrusion die outlet is integrated with a mold so that the plasticized extrudate is injection molded at substantially the same temperature as the chocolate to provide a complex form for the chocolate product.*

*34. The process of claim 30, wherein the plasticized extrudate is injection molded through a gate having a cross-section size of from 100 μm to 500 μm to form a flexible filament of semi-solid chocolate.*

*35. The process of claim 34, which further comprises directing the plasticized filament of semi-solid chocolate into a mold until the mold is filled to allow full consolidation of the chocolate to occur; releasing the extrusion pressure; and then opening the mold to obtain the chocolate product.*

*36. The process of claim 30, wherein the plasticized extrudate maintains its flexibility for from 5 minutes to 4 hours.*

*37. The process of claim 30, which is substantially isothermal, and the extrusion is conducted through a zone of convergence having a convergence ratio of at least 1.5 at a temperature of 10° C. to 35° C. under a pressure of 1 to 1000 bar and at an extrusion rate of from about 0.1 cm/sec to 1 m/s.*

*38. The process of claim 30, wherein the chocolate fed to the extruder is in the form of buttons, and the chocolate is passed through the extruder without heating the extruder to heat the chocolate and without cooling the extruder to cool the chocolate.*

*39. The process of claim 30, wherein the extruder has a zone of convergence with a contraction ratio of greater than 1.5; and which further comprises applying pressure to the chocolate upstream of the zone of convergence and extrusion die outlet at a temperature of from 0 to 35° C. and a pressure of from 1 to 1000 bars; and extruding the chocolate through the extrusion die outlet at an extrusion rate of greater than 0.1 cm/s.*

*40. The process of claim 39, wherein the extrusion die outlet is integrated with a mold so that the extruded material is injection molded into a complex form prior to hardening.*

*41. The process of claim 39, which further comprises coextruding the chocolate with another food material to form a chocolate product.*

*42. The process of claim 39, which further comprises coextruding the chocolate with a fondant to form a chocolate product.*

*43. The process of claim 38, which further comprises coextruding the chocolate with ice cream to form a chocolate product.*

*44. A process for forming a chocolate product which comprises:*

*feeding a liquid, pourable paste, or semi-solid form of a fat-containing confectionery material into an extruder having a zone of convergence and an extrusion die outlet;*

*cooling the material to a set form so as to form a non-pourable material; and*

*passing the non-pourable material under pressure and at a temperature below its pour point temperature through the extruder and to and through the zone of convergence and the outlet to thereby deform, plasticize and extrude a non-pourable, flexible, plasticized chocolate extrudate from the outlet, and*

*controlling the temperature, extrusion pressure and extrusion rate to form a plasticized extrudate having a predetermined form, a temperature substantially the same as the temperature of the chocolate prior to extrusion and a plasticity at a temperature which approximates the temperature of the extrudate upon issuance from the outlet, which plasticity is maintained prior to hardening for a period of time sufficient to allow the form of the extrudate to be changed or modified to form the chocolate product.*

* * * * *